(12) United States Patent
Chen et al.

(10) Patent No.: US 6,661,599 B1
(45) Date of Patent: Dec. 9, 2003

(54) ENHANCED ADAPTIVE FEEDFORWARD CONTROL TO CANCEL ONCE-PER-REVOLUTION DISTURBANCE BY SHAPING THE INTERNAL MODE

(75) Inventors: YangQuan Chen, Singapore (SG); Ming Zhong Ding, Singapore (SG); Kian Keong Ooi, Singapore (SG); Ricky Wei Watt Yeo, Singapore (SG); Louis Seng Hong Pang, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 472 days.

(21) Appl. No.: 09/641,113

(22) Filed: Aug. 17, 2000

Related U.S. Application Data

(60) Provisional application No. 60/151,205, filed on Aug. 27, 1999.

(51) Int. Cl.$^7$ .............................................. G11B 5/596
(52) U.S. Cl. ................................................... 360/77.04
(58) Field of Search .............................. 360/77, 77.02, 360/77.04, 77.08; 700/44

(56) References Cited

U.S. PATENT DOCUMENTS

| | | | |
|---|---|---|---|
| 4,135,217 A | 1/1979 | Jacques et al. ............... 360/77 |
| 4,412,341 A | 10/1983 | Gersho et al. ............... 364/574 |
| 4,533,991 A | 8/1985 | Georgis ....................... 364/164 |
| 4,536,809 A | 8/1985 | Sidman ....................... 360/77 |
| 4,594,622 A | 6/1986 | Wallis ......................... 360/77 |
| 4,616,276 A | 10/1986 | Workman ..................... 360/77 |
| 4,761,595 A | 8/1988 | Goor .......................... 318/568 |
| 4,769,583 A | 9/1988 | Goor .......................... 318/568 |
| 5,072,318 A | 12/1991 | Yu ........................... 360/77.02 |
| 5,541,784 A | 7/1996 | Cribbs et al. ................. 360/75 |
| 5,550,685 A | 8/1996 | Drouin ...................... 360/77.08 |
| 5,585,976 A | 12/1996 | Pham ....................... 360/77.04 |
| 5,923,491 A * | 7/1999 | Kisaka et al. ............. 360/77.04 |

* cited by examiner

Primary Examiner—David Hudspeth
Assistant Examiner—Mitchell Slavitt
(74) Attorney, Agent, or Firm—David K. Lucente; Derek J. Berger

(57) ABSTRACT

A method of producing a modified control signal to an actuator arm assembly of a disc drive to reduce RRO includes the step of generating a correction signal corresponding to a position error signal of a current track. Then to determine a high pass filter transfer function of a high pass filter to decrease a gain of an unwanted frequency generated when increasing a learning gain of the correction signal to achieve a faster convergence without any loss of performance in the disc drive. Then to determine filter parameters from the high pass filter transfer function, and to filter the correction signal by passing the correction signal through the high pass filter to generate a modified control signal to the actuator arm assembly of the disc drive using the filtered correction signal to remove the RRO on a next track.

17 Claims, 4 Drawing Sheets

ENHANCED ADAPTIVE FEEDFORWARD CONTROL TO CANCEL ONCE-PER-REVOLUTION DISTURBANCE BY SHAPING THE INTERNAL MODE

RELATED APPLICATION

This application claims the benefit of U.S. Provisional Application Serial No. 60/151,205, filed Aug. 27, 1999 under 35 U.S.C. 119(e).

FIELD OF THE INVENTION

The present invention relates to the field of mass storage devices. More particularly, this invention relates to a method of repeatable runout compensation in a disc drive.

BACKGROUND OF THE INVENTION

One key component of any computer system is a device to store data. Computer systems have many different places where data can be stored. One common place for storing massive amounts of data in a computer system is on a disc drive. The most basic parts of a disc drive are an information storage disc that is rotated, an actuator that moves a transducer head to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer head is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the transducer head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of disc drive. Servo feedback information is used to accurately locate the transducer head. The actuator assembly is moved to the required position and held very accurately during a read or write operation using the servo information.

The actuator is rotatably attached to a shaft via a bearing cartridge which generally includes one or more sets of ball bearings. The shaft is attached to the base and may be attached to the top cover of the disc drive. A yoke is attached to the actuator. The voice coil is attached to the yoke at one end of the rotary actuator. The voice coil is part of a voice coil motor which is used to rotate the actuator and the attached transducer or transducers. A permanent magnet is attached to the base and cover of the disc drive. The voice coil motor which drives the rotary actuator comprises the voice coil and the permanent magnet. The voice coil is attached to the rotary actuator and the permanent magnet is fixed on the base. A yoke is generally used to attach the permanent magnet to the base and to direct the flux of the permanent magnet. Since the voice coil sandwiched between the magnet and yoke assembly is subjected to magnetic fields, electricity can be applied to the voice coil to drive it so as to position the transducers at a target track.

In disc drives with relatively high track densities, a servo feedback loop is used to maintain a transducer head over the desired track during read or write operations. This is accomplished by utilizing prerecorded servo information either on a dedicated servo disc or on angularly spaced sectors that are interspersed among the data on a disc. During track following, the servo information sensed by the transducer head is demodulated to generate a position error signal (PES), which is an indication of the position error of the transducer head away from the track center. The PES is then converted into an actuator control signal, which is fed back to control an actuator that positions the transducer head.

In general, there are two forms of transducer head positioning errors: repeatable and non-repeatable. Non-repeatable errors are generally unpredictable and therefore cannot be removed until after they occur. Repeatable errors, which are generally caused by mechanical irregularities in the structure of the disc drive or errors introduced when writing the servo tracks, can be predicted and therefore theoretically can be canceled out as they occur. In general, these repeatable rotational runout (RRO) errors are removed by introducing a compensation signal into the loop that cancels the repeatable positioning error. Techniques for generating such compensation signals are generally referred to as feedforward cancellation.

Because the feedforward cancellation signal is introduced into the servo loop, it can cause the servo loop to become unstable under certain conditions. In particular, if the cancellation signal is too large for a given PES, the cancellation signal can cause the transducer head to oscillate across the track center line, thereby keeping the transducer head from reaching a steady state position over the track.

To avoid this problem, the prior art has developed adaptive feedforward cancellation (AFC). Under AFC, the cancellation signal is initially set to zero. The position error signal is then measured at a first sector and is used to set the amplitude of the cancellation signal for the next sector. To avoid instability, the PES is multiplied by a learning rate, which is between zero and one. Under some systems, the learning rate is reduced at each successive sector to further ensure stability while improving the likelihood that the cancellation signal will fully cancel the RRO.

One problem with current AFC technique is that an increased learning gain can amplify the PES at the neighboring frequencies around the one to be canceled. Generally to achieve a faster AFC learning, larger learning gain is needed. Larger learning can result in amplifying the neighboring frequencies, which in turn can result in an increased disturbance rejection. Another problem with amplifying neighboring frequencies when the actual once-per-revolution disturbance is small, is that the measured PES RRO with AFC on can be slightly smaller than the one with AFC off, and for non repeatable runout errors (NRRO), the measured PES NRRO with AFC on can be higher than when the one with AFC off.

What is needed is an AFC that can use a larger gain for faster convergence of feedforward adaptation without significantly amplifying the neighboring frequencies.

SUMMARY OF THE INVENTION

A disc drive having a disc drive controller for positioning a transducer head over a track includes a servo controller for generating a modified control signal for reducing a RRO. The disc drive includes an actuator arm assembly comprising an actuator and a transducer head. The actuator is capable of moving the transducer head based on at least in part on the modified control signal from the servo controller, and further the actuator arm assembly is capable of generating a position error signal based on the position of the transducer head over a current track. The disc drive controller further includes an adaptive feedforward cancellation component for producing a correction signal for a next track based on the position error signal received from the actuator arm assembly. The disc drive controller further includes a high pass filter, coupled to the adaptive feedforward cancellation component, having a high pass filter transfer function to decrease a gain of unwanted frequencies when increasing a learning gain of the correction signal to achieve a faster convergence of the adaptive feedforward cancellation. The disc drive controller then produces a modified control signal for the actuator arm assembly using the filtered correction signal to reduce the RRO on a next track.

Also discussed is a method of producing a modified control signal to an actuator arm assembly of a disc drive to reduce RRO includes the step of generating a correction signal corresponding to a position error signal of a current track. Then the method includes determining a high pass filter transfer function of a high pass filter to decrease a gain of an unwanted frequency when increasing a learning gain of the correction signal. Then the next step includes forming filter parameters from the high pass filter transfer function, and to filter the correction signal by passing the correction signal through the high pass filter formed using the high pass filter parameters. Then generating a modified control signal to the actuator arm assembly of the disc drive using the filtered correction signal to remove RRO on a next track.

Advantageously, the procedure set forth above and the apparatus for generating the modified control signal to remove RRO can produce a faster convergence without loss of performance in a disc drive. The above procedure can be incorporated in microcode and used to control the servo circuitry to implement the invention.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
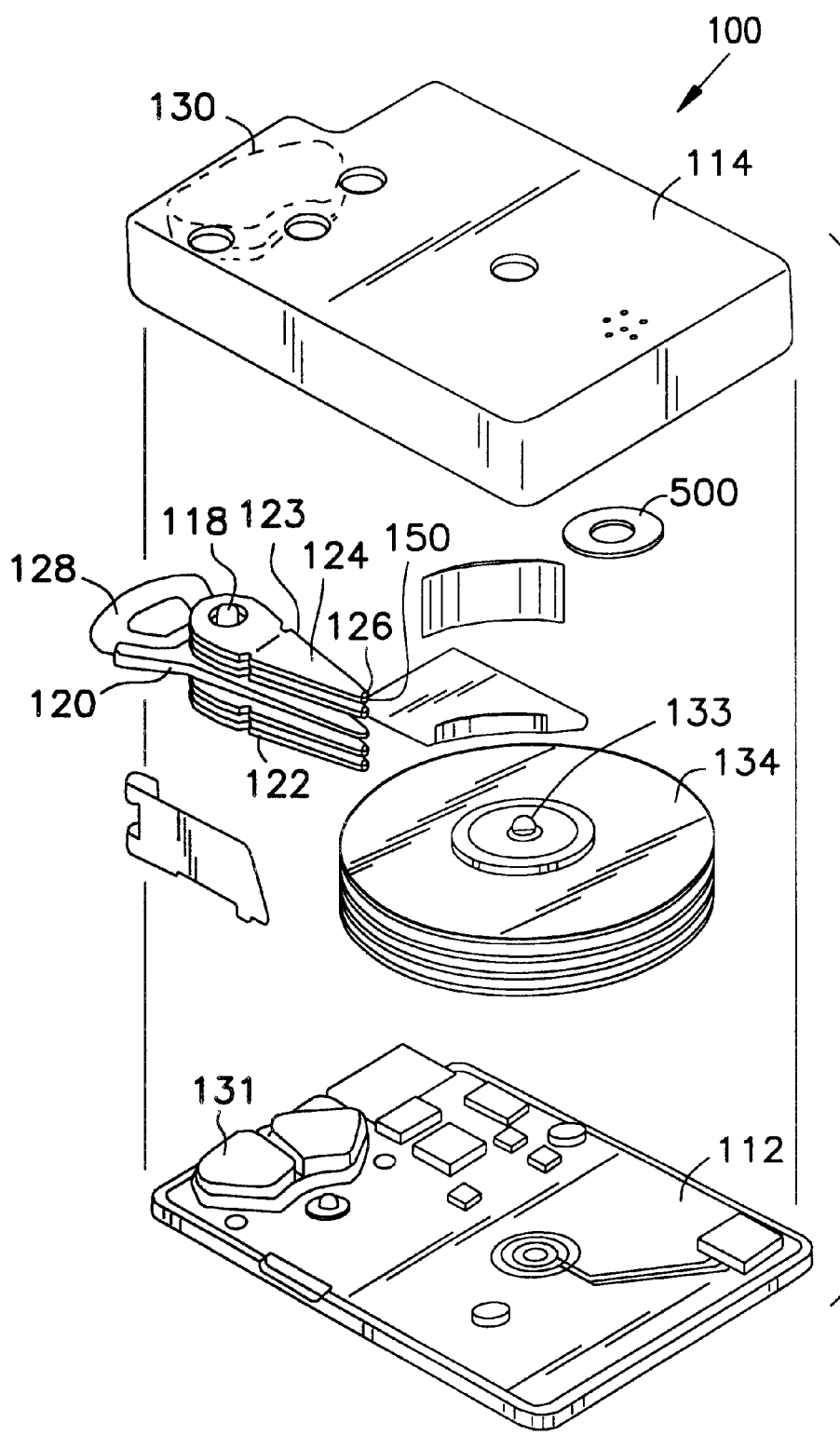
FIG. 1 is an exploded view of a disc drive with a multiple disc stack.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. An inertia ring 500 is attached to the cover 114. Rotatably attached to the base 112 on an actuator shaft 118 is an actuator arm assembly 120. The actuator arm assembly 120 includes a comb-like structure 122 having a plurality of actuator arms 123. Attached to the separate actuator arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 131 and a second magnet 130. As shown in FIG. 1, the second magnet 130 is associated with the cover 114. The first and second magnets 130, 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

Figure 2:
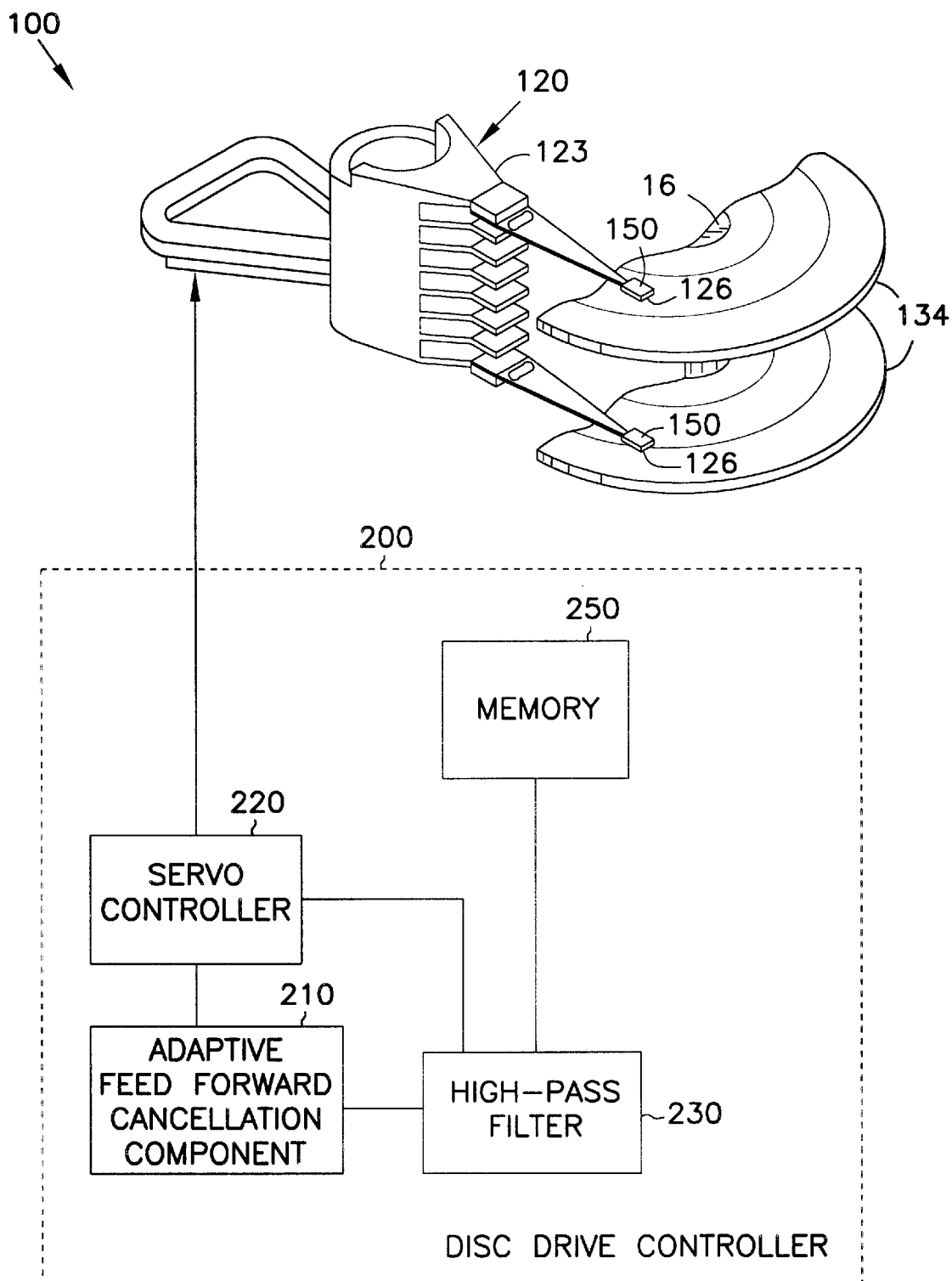
FIG. 2 is a schematic representation of a disc drive including portions of the disc drive controller used in present subject matter.

FIG. 2 is a schematic representation of a disc drive 100 and further includes selected portions of a disc drive controller 200 used in generating a modified control signal for reducing a RRO in the disc drive 100. In this embodiment the disc drive 100 includes at least one disc 134 rotatably attached to a base through a shaft 16. The disc drive 100 also includes an actuator 123 having a transducer head 126 and transducer 150 for reading and writing to the at least one disc 134. The actuator 123 carrying the transducer head 126 is in a transducing relation with respect to the disc 134. A disc drive controller 200 including a servo controller 220 is coupled to the actuator arm assembly 120. The actuator arm assembly 120 is capable of moving the transducer head 126 on at least in part on a modified control signal from the servo controller 220. The actuator arm assembly 120 is also capable of generating a position error signal based on a position of the transducer head 126 over a current track. The disc drive controller further includes an adaptive feedforward cancellation component 210 coupled to the servo controller 220 for producing a correction signal for a next track based on the position error signal received from the actuator arm assembly 120. In one embodiment the adaptive feedforward cancellation component 210 generates the correction signal by determining a servo loop transfer function relative to a feedforward cancellation component of the disc drive 100, then the servo controller 220 determines filter parameters from the servo loop transfer function. Then the actuator arm assembly 120 measures the position error value at the current track. Then the position error value is filtered using the determined filter parameters to create a filtered position error value, then the adaptive feedforward cancellation component 210 determines a tap weight for the correction signal for the next track based in part on the filtered position error value and a tap weight for the current track. The disc drive controller further includes a high pass filter 230 coupled to the servo controller 220 and adaptive feedforward cancellation component 210 for decreasing a gain of unwanted frequencies when increasing a learning gain of the correction signal to achieve a faster convergence of the adaptive feedforward cancellation. In one embodiment the high pass filter 230 receives the correction signal from the adaptive feedforward cancellation component 210 and outputs a filtered correction signal. Then the servo controller 220 generates a modified control signal for the actuator arm assembly 120 using the filtered correction signal to achieve a faster adaptive feedforward control learning convergence without any loss of performance in the disc drive 100. In one embodiment the high pass filter 230 includes a high pass filter transfer function to decrease the gain of an unwanted frequency generated when increasing a learning gain of the correction signal. In one embodiment the high pass filter transfer function is computed based on $$((b_0+b_1z^{-1}+ \ldots +b_mz^{-m})/(1+a_0+a_1z^{-1}+ \ldots +a_nz^{-n}))$$

where z is a discrete-time counterpart of the laplacian transformation operator, and where $a_0, a_1, \ldots a_n$, and $b_0, b_1, \ldots b_m$ are filter parameters. The high pass filter parameters are based on a servo-loop transfer function of the disc drive 100. In another embodiment a simplified high pass filter transfer function is computed based on $(1/(1+az^{-1}))$, where 'a' is a high pass filter parameter, and z is a discrete-time counterpart of the laplacian transformation operator. Computing the high pass filter transfer function using the simplified high pass filter transfer function generally requires less CPU time and yet provides a generally effective compromise in filtering the unwanted frequencies generated when increasing a learning gain to obtain a faster convergence speed and a minimum performance loss in frequencies around a fundamental frequency of interest. In one embodiment the servo controller 220 increases a learning gain a factor of (1/a). In one embodiment the value of the high pass filter parameter 'a' is greater than 0 and less than or equal to 1. The disc drive controller further includes a memory 250 coupled to the high pass filter 230 for storing the computed high pass filter parameters.

Figure 3:
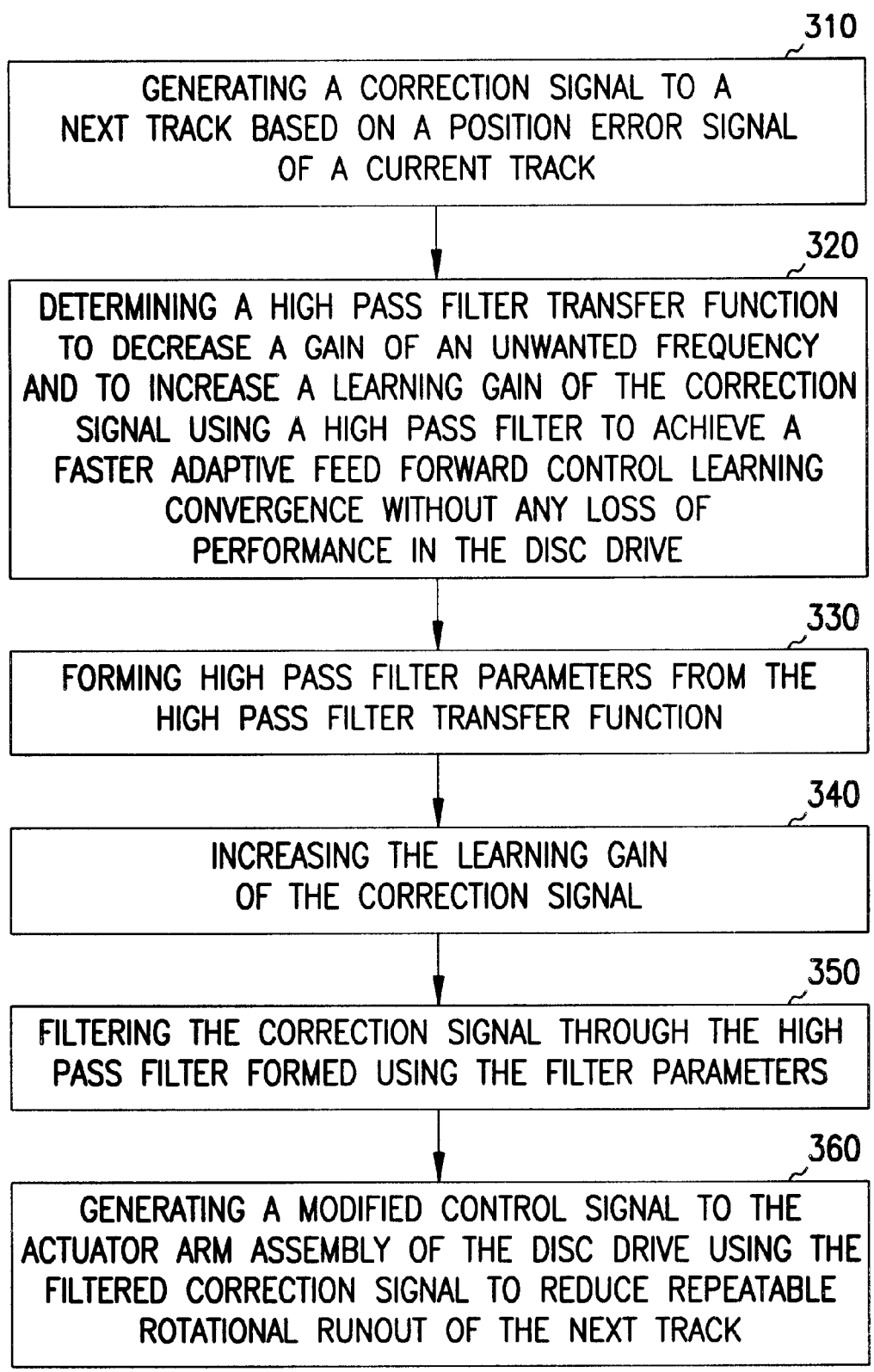
FIG. 3 is a flow diagram of the procedure of the instant invention.

FIG. 3 is a flow diagram illustrating one embodiment of the method of generating a modified control signal to an actuator arm assembly of a disc drive for reducing a RRO. The first step in the process includes receiving a correction signal to a next track based on a position error signal of a current track from the actuator arm assembly 310. In one embodiment the correction signal is generated by determining a servo loop transfer function relative to a feedforward cancellation component of the disc drive. Then the servo loop transfer function is inverted to form filter parameters. Then measuring a position error value at the current track. Then the position error value is passed through a filter formed from the filter parameters to generate a filtered position error value. Then a tap weight is determined for the correction signal for the next track based in part on the filtered position error value and tap weight for the current track. Upon receiving the correction signal from the actuator arm assembly, the next step in the method includes determining a high pass filter transfer function of a high pass filter to decrease a gain of an unwanted frequency generated during increasing a learning gain of the correction signal to achieve a faster adaptive feedforward control learning convergance without any loss of performance in the disc drive 320. Then the next step in the process includes forming high pass filter parameters from the determined high pass filter transfer function 330. In one embodiment the high pass filter transfer function is determined using $$((b_0+b_1z^{-1}+ \ldots +b_mz^{-m})/(1+a_0+a_1z^{-1}+ \ldots +a_nz^{-n}))$$

where z is a discrete-time counterpart of the laplacian transformation operator, and where $a_0, a_1, \ldots a_n$, and $b_0, b_1, \ldots b_m$ are filter parameters. In another embodiment the transfer function is determined using a simplified transfer function $(1/(1+az^{-1}))$, where 'a' is a high pass filter parameter, and z is a discrete-time counterpart of the laplacian transformation operator. Generally the simplified transfer function requires less CPU time and yet provides a generally effective compromise in filtering the unwanted frequencies generated when increasing a learning gain to obtain a faster convergence speed and a minimum performance loss in freequencies around a fundamental frequency of interest. In this embodiment the high pass filter parameter is formed using a servo-loop transfer function of the disc drive 100. Then the next step in the process includes increasing the learning gain of the correction signal 340. In one embodiment the learning gain is increased by a factor of (1/a). In this embodiment the high pass filter parameter 'a' is greater than 0 and less than or equal to 1. Then the next step is to filter the correction signal through the high pass filter formed using the filter parameter 350. Then to generate a modified control signal to the actuator arm assembly of the disc drive using the filtered correction signal to reduce the repeatable rotational runout error of the next track 360.

Figure 4:
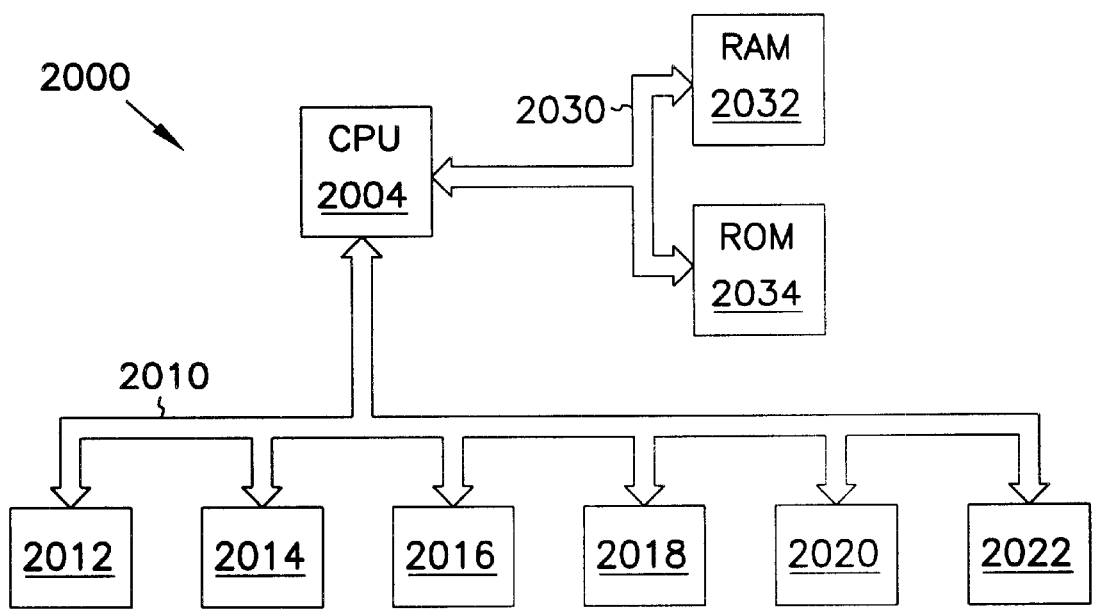
FIG. 4 is a schematic view of a computer system.

FIG. 4 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2000 includes a disc drive device which includes the ramp described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

CONCLUSION

In conclusion, a disc drive controller 200 including the actuator arm assembly reduces repeatable rotational runout error during a seek operation. The method comprises receiving a correction signal to a next track based on a position error signal of a current track from the actuator arm assembly 310. The next step includes determinig a high pass filter transfer function of a high pass filter to decrease a gain of an unwanted frequency generated during increasing a learning gain of the correction signal to achieve a faster adaptive feedforward control learning convergance without any loss of performance in the disc drive 320. Then the next step in the process includes forming high pass filter parameters from the determined high pass filter transfer function 330. Then the next step in the process includes increasing the learning gain of the correction signal 340. Then the next step is to filter the correction signal through the high pass filter formed using the filter parameter 350. Then to generate a modified control signal to the actuator arm aseembly of the disc drive using the filtered correction signal to reduce the repeatable rotational runout error of the next track 360.

Also discussed is a disc drive 100 including an actuator arm assembly 120 having a transducer head 126 and a transducer 150 for reading and writing to the disc 134. The actuator arm assembly 120 carrying the transducer 126 in a transducing relation with respect to the disc 134. A disc drive controller 200 including a servo controller 220 is coupled to the actuator arm assembly 120. The actuator arm assembly 120 is capable of moving the transducer head 126 on at least in part on a modified control signal from the servo controller 220. The actuator arm assembly 120 is also capable of generating a position error signal based on a position of the transducer head 126 over a current track. The disc drive controller further includes an adaptive feedforward cancellation component 210 coupled to the servo controller 220 for producing a correction signal for a next track based on the position error signal received from the actuator arm assembly 120. The disc drive controller further includes a high pass filter 230 coupled to the servo controller 220 and adaptive feedforward cancellation component 210 for decreasing a gain of unwanted frequencis when increasing a learning gain of the correction signal to achieve a faster convergance of the adaptive feedforward cancellation. In one embodiment the high pass filter 230 receives the correction signal from the adaptive feedforward cancellation component 210 and outputs a filtered correction signal. Then the servo controller 220 generates a modified control signal for the actuator arm assembly 120 using the filtered correction signal to achieve a faster adaptive feedforward control learning convergance without any loss of performance in the disc drive 100.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method comprising steps of:
   (a) generating a correction signal;
   (b) determining a high pass filter transfer function of a high pass filter to decrease a gain of an unwanted frequency generated and to not significantly amplify neighboring frequencies during increasing a learning gain of the correction signal;
   (c) forming high pass filter parameters from the high pass filter transfer function;
   (d) increasing the learning gain of the correction signal;
   (e) filtering the correction signal through the high pass filter formed using the high filter parameters; and
   (f) generating a modified control signal using the filtered correction signal, whereby positional error is reduced.

2. The method of claim 1, wherein the generating a correction signal step (a) further comprises:
   (a)(i) determining a servo loop transfer function relative to a feedforward cancellation component of the disc drive;
   (a)(ii) inverting the servo loop transfer function to form filter parameters;
   (a)(iii) measuring a position error value at the current track;
   (a)(iv) passing the position error value through a filter formed from the filter parameters to generate a filtered position error value; and
   (a)(v) determining a tap weight for the correction signal for the next track based in part on the filtered position error value and a tap weight for the current track.

3. The method of claim 1, wherein the determining step comprises determining the high pass filter transfer function using $$((b_0+b_1z^{-1}+ \ldots +b_mz^{-m})/(1a_0+a_1z^{-1}+ \ldots +a_nz^{-n}))$$

where z is a discrete-time counterpart of the laplacian transformation operator, and where $a_0, a_1 \ldots a_n$, and $b_0, b_1 \ldots b_m$ are filter parameters.

4. The method of claim 3, wherein the forming step comprises forming filter parameters based on a servo-loop transfer function of the disc drive.

5. The method of claim 1, wherein the determining step comprises determining a simplified high pass filter transfer function using $(1/(1+az^{-1}))$, where 'a' is a high pass filter parameter, and z is a discrete-time counterpart of the laplacian transformation operator.

6. The method of claim 5, wherein the forming step comprises forming the high pass filter parameter based on a servo-loop transfer function of the disc drive.

7. The method of claim 6, wherein the increasing step comprises increasing the learning gain by a factor of $(1/a)$.

8. The method of claim 7, wherein the high pass filter parameter 'a' is greater than 0 and less than or equal 1.

9. A system comprising:
   a controller;
   an adaptive feedforward cancellation component producing a correction signal for a next position based on a position error signal of a current position; and
   a high pass filter coupled to receive the correction signal and that provides a filtered correction signal, wherein the controller produces a modified control signal using the filtered correction signal to not significantly amplify neighboring frequencies, thus allowing a faster learning convergence.

10. The disc drive of claim 8, wherein the high pass filter having a high pass filter transfer function to decrease a gain of an unwanted frequency generated when increasing a learning gain of the correction signal.

11. The disc drive of claim 10, wherein the high pass filter transfer function comprises $$((b_0+b_1z^{-1}+ \ldots +b_mz^{-m})/(1a_0+a_1z^{-1}+ \ldots +a_nz^{-n}))$$

where z is a discrete-time counterpart of the laplacian transformation operator, and where $a_0, a_1, \ldots a_n$, and $b_0, b_1 \ldots b_m$ are filter parameters.

12. The disc drive of claim 11, wherein high pass filter parameters are based on a servo-loop transfer function of the disc drive.

13. The disc drive of claim 10, wherein the high pass filter transfer function comprises a simplified high pass filter transfer function $(1/(1+az^{-1}))$, where 'a' is a high pass filter parameter, and z is a discrete-time counterpart of the laplacian transformation operator.

14. The disc drive of claim 13, wherein the servo controller further increases a leaning gain by a factor of (1/a).

15. The disc drive of claim 14, wherein the value of the high pass filter parameter 'a' is greater than 0 and less than or equal to 1.

16. The disc drive of claim 15, further includes a memory, coupled to the high pass filter to store the high pass filter parameter.

17. A disc drive having a disc drive controller for positioning a transducer head over a track, comprising: means for generating a modified control signal that does not significantly amplify neighboring frequencies, thus allowing for the use of a larger gain for a faster convergence to remove repeatable rotational runout error.

* * * * *